US012311203B2

(12) United States Patent
Ye

(10) Patent No.: US 12,311,203 B2
(45) Date of Patent: May 27, 2025

(54) INTELLIGENT LIFE-SAVING SYSTEM FOR HIGH-RISE BUILDING AND ELECTROMECHANICAL DEVICE FOR INTELLIGENT FAST DESCENT

(71) Applicant: Qiushi Ye, Anhui (CN)

(72) Inventor: Qiushi Ye, Anhui (CN)

(73) Assignee: Qiushi Ye, Anqing (CN)

( * ) Notice: Subject to any disclaimer, the term of this patent is extended or adjusted under 35 U.S.C. 154(b) by 824 days.

(21) Appl. No.: 17/561,870

(22) Filed: Dec. 24, 2021

(65) Prior Publication Data

US 2022/0111231 A1 Apr. 14, 2022

Related U.S. Application Data

(63) Continuation of application No. PCT/CN2019/097583, filed on Jul. 24, 2019.

(51) Int. Cl.
*A62B 1/06* (2006.01)
*A62B 1/08* (2006.01)

(52) U.S. Cl.
CPC .................................... *A62B 1/08* (2013.01)

(58) Field of Classification Search
CPC .................................... A62B 1/08; A62B 1/10
See application file for complete search history.

(56) References Cited

U.S. PATENT DOCUMENTS

| | | | | |
|---|---|---|---|---|
| 10,166,413 | B1 * | 1/2019 | Ragsdale | A62B 1/08 |
| 12,186,596 | B2 * | 1/2025 | Bailey | F16D 59/00 |
| 2010/0065373 | A1 * | 3/2010 | Stone | A62B 1/10 182/233 |
| 2017/0333735 | A1 | 11/2017 | Krupp et al. | |

FOREIGN PATENT DOCUMENTS

| | | | |
|---|---|---|---|
| CN | 1448196 | A | 10/2003 |
| CN | 2580988 | Y | 10/2003 |
| CN | 101095971 | A | 1/2008 |
| CN | 201410236 | Y | 2/2010 |
| CN | 204219632 | U | 3/2015 |

OTHER PUBLICATIONS

International Search Report of PCT/CN2019/097583.
Written Opinion of PCT/CN2019/097583.

* cited by examiner

*Primary Examiner* — Amy J. Sterling

(57) ABSTRACT

The present invention discloses an intelligent life-saving system for a high-rise building and an electromechanical device for intelligent fast descent. The life-saving system includes a coverall with short-term high temperature resistance, cushioning and collision resistance, an oxygen-supplying helmet, a high-temperature resistant sling, and an electromechanical device for intelligent fast descent. The electromechanical device includes an intelligent detection and control device, a frame, a follow-up reel, a main shaft, and a fire-proofing and flame-retardant lifeline wound around the follow-up reel. The electromechanical device further includes a permanent magnet generator; brake mechanisms, where the intelligent detection and control device is configured to control the current of an active brake coil in real time based on the descent speed of the fire-proofing and flame-retardant lifeline to adjust a frictional resistance between dynamic brake pads and a stationary brake pad; and a forced braking manipulation.

5 Claims, 8 Drawing Sheets

INTELLIGENT LIFE-SAVING SYSTEM FOR HIGH-RISE BUILDING AND ELECTROMECHANICAL DEVICE FOR INTELLIGENT FAST DESCENT

CROSS-REFERENCE TO RELATED APPLICATION

This application is a bypass continuation application of PCT application no.: PCT/CN2019/097583. This application claims priorities from PCT Application PCT/CN2019/097583, filed Jul. 24, 2019, the contents of which is incorporated herein in the entirety by reference.

TECHNICAL FIELD

The present invention relates to an intelligent life-saving system for a high-rise building and an electromechanical device for intelligent fast descent.

BACKGROUND

Most of rescuees in a building on fire have personal accidents, such as direct falling, or poisoning or suffocation by inhaling excessive toxic gases from combustion, or scalding by high temperature gas without protection, due to improper handling caused by incomplete life-saving devices.

An intelligent fast descent backpack for high-altitude escape is currently available. A rescuee wearing the backpack can lock a rope in the backpack onto an escape pile and jump from a balcony or a window. The escape backpack is disclosed in Chinese patent document CN 107281660 B.

However, the escape backpack does not provide protection to a rescuee, and a rescuer may also be injured when exposed to fire smoke. When a rope released from the backpack passes through flame, a part of it is always burned to break. Moreover, the rope is short, generally less than 80 m long.

In the process of implementing the present invention, the inventor finds that:

If complete life-saving devices are used to quickly leave the site of fire, the chances for rescuees surviving in good condition will be greatly improved. Furthermore, it is important to have psychological assistance by voice at the site throughout the whole process, a fully enclosed life-saving coverall with oxygen supply for breathing, fire prevention, collision resistance and cushioning for landing to the ground, and most of all, an electromechanical device with intelligent control of automatic power generation and landing speed for fast descent. In view of this, an intelligent life-saving system for a high-rise building is developed.

SUMMARY OF THE INVENTION

One objective of the present invention is to provide an intelligent life-saving system for a high-rise building, so as to provide complete life-saving devices for safe and quick escape from the high-rise building.

Another objective of the present invention is to provide an operating method of an intelligent life-saving system for a high-rise building. The intelligent life-saving system is intelligently networked with a fire-fighting system of the high-rise building to automatically detect a floor location where the intelligent life-saving system for the high-rise building is located, and provide voice guidance regarding an application method and psychological assistance to a rescue at the site of fire throughout the whole process, so as to achieve safe escape from the high-rise building.

Another objective of the present invention is to provide an electromechanical device for intelligent fast descent to achieve fast descent and safety control over a fast descent process.

Therefore, according to the first aspect, the present invention provides an intelligent life-saving system for a high-rise building. The life-saving system includes a coverall with short-term high temperature resistance, cushioning and collision resistance, including shoes and an oxygen-supplying helmet, connected to the coverall to close and isolate a rescuee from the outside for short-term oxygen supply; a high-temperature resistant sling that is integrated with the coverall and provides a predetermined bionic landing posture of a human body; and an electromechanical device, suspended in the air and closed by a fire-proofing and flame-retardant bag, for release of a fire-proofing and flame-retardant lifting rope and fast descent control. A lower end of the fire-proofing and flame-retardant lifting rope can be quickly connected to and detached from the high-temperature resistant sling.

Further, the electromechanical device, when toggled, triggers to initiate an intelligent detection and control device on the electromechanical device for intelligent fast descent, establishes a wireless communication link with a building fire detection and alarm system for users, acquires information on location and scope of a fire, and accordingly provides voice counseling and guidance regarding escape steps for a rescuee, an application method of the intelligent life-saving system for the high-rise building and psychology of the rescuee.

Further, the electromechanical device, along with the rescuee, reaches within 2 m near a suspension ring buckle on a wall for fixedly suspending the electromechanical device for escape. The intelligent detection and control device on the electromechanical device automatically detects and identifies passive RF cards within 2 m near the suspension ring buckle on the wall by radio frequency technology, automatically identifies and determines an exact distance from a location where the rescuee is located to the ground, and intelligently calculates a speed control scheme for safe landing of the rescuee from such a height.

Further, the coverall is a relatively soft airtight fire-proofing and flame-retardant coverall integrated with a neck guard, gloves, shoes, clothes and trousers, the coverall is made of a double-layer meta-aromatic polyamide cloth lined with gel cold storage blocks, and uniformly sprayed with a fire-proofing and flame-retardant layer on an outer surface of an outer aromatic polyamide cloth layer.

Further, a lower abdomen position of the coverall is connected to the neck guard of the coverall through a locking zipper, and self-adhesive strips are formed at an inner side of the locking zipper. When the locking zipper is pulled to the neck guard, the self-adhesive strips on the inner side of the locking zipper are automatically stuck and sealed by a front and back pressure from the locking zipper and the body of the rescuee.

Further, the oxygen-supplying helmet has a concave groove around the neck guard of a rescuee, and the neck guard of the coverall is higher than the concave groove on the oxygen-supplying helmet. An upper end of the neck guard is provided with a self-locking cable, after the self-locking cable is pulled, the upper end of the neck guard is embedded into the concave groove on the oxygen-supplying helmet to achieve a locked and sealed connection. In this process, the gas exhaled by the rescuee retains in the oxygen-supplying helmet and the coverall, forming a positive internal pressure to keep fire heat and toxic gases out.

Further, the oxygen-supplying helmet is lined with gel cold storage blocks, and the oxygen-supplying helmet is provided with a miniature oxygen bag or a sodium peroxide oxygen generating bag.

According to another aspect, the present invention provides an electromechanical device for intelligent fast descent, including a frame, a follow-up reel, a main shaft, and a fire-proofing and flame-retardant lifeline wound around the follow-up reel, and further including: a permanent magnet generator, including a multipolar permanent magnet fastened to the main shaft, and a coil rotating synchronously with the follow-up reel, and configured to generate electricity and form a rotational resistance when the coil rotates with the follow-up reel; brake mechanisms, arranged symmetrically on both sides of the follow-up reel, including a stationary brake ring arranged on the frame and a plurality of arc-shaped dynamic brake pads rotating synchronously with the follow-up reel, where the plurality of arc-shaped dynamic brake pads are annularly arranged along an inner annular wall of the stationary brake pad; a plurality of active braking manipulation mechanisms, arranged at an inner side of the dynamic brake pads and pressed against the dynamic brake pads radially outwards, including a brake pad spindle, primary brake springs and an active brake soft magnetic sleeve that are arranged radially along the follow-up reel, an active brake coil wound around the active brake soft magnetic sleeve, and a multipolar permanent magnet ring arranged on the main shaft, where the active brake coil and the active brake soft magnetic sleeve form an electromagnet; an intelligent detection and control device, configured with a function to control current of the active brake coil in real time based on a descent position and a descent speed of the fire-proofing and flame-retardant lifeline to adjust a frictional resistance between the dynamic brake pads and a stationary brake pad; a plurality of auxiliary braking manipulation mechanisms, arranged at the inner side of the dynamic brake pads and pressed against the dynamic brake pads radially outwards, including an auxiliary brake pad spindle, auxiliary brake springs and an auxiliary brake sleeve; and a forced braking manipulation mechanism, including a primary brake spring fixing frame, a fixing forced braking activation clamp, a forced braking activation cable and a forced braking activation self-locking ring, where the primary brake spring fixing frame is configured to restrain each primary brake spring, and the forced braking activation self-locking ring is secured at a predetermined length of the fire-proofing and flame-retardant lifeline to pull the forced braking activation cable when the fire-proofing and flame-retardant lifeline is released to the predetermined length, so as to force the fixing forced braking activation clamp to detach from the primary brake spring fixing frame, so that the primary brake springs are in a released state.

Further, an active braking manipulation mechanism is centered on the inner side of the dynamic brake pads, and a pair of auxiliary braking manipulation mechanisms are arranged on both sides of the active braking manipulation mechanism, where a brake pad spindle of the active braking manipulation mechanism and an auxiliary brake pad spindle of the pair of auxiliary braking manipulation mechanisms are arranged in a strip shape.

Further, two sets of brake mechanisms are axially arranged in parallel on both sides of the follow-up reel.

Further, the auxiliary brake sleeve is an auxiliary brake permanent magnet sleeve having the same polarity as an opposite side of the multipolar permanent magnet fastened to the main shaft, for compressing the auxiliary brake springs in an impulsive manner when the follow-up reel rotates.

Further, a fast descent control method for the electromechanical device is as follows: extending the fire-proofing and flame-retardant lifeline with a rush-down force and body gravity of a rescuee after the rescuee wrapped in an oxygen-supplying helmet and a coverall jumps down, when the auxiliary brake springs work and the primary brake springs are locked by the primary brake spring fixing frame; pulling, by the fire-proofing and flame-retardant lifeline on the follow-up reel, the forced braking activation cable through the forced braking activation self-locking ring to force the primary brake spring fixing frame to lose restraint, and the primary brake springs to pop open after the rescuee descends to a set height above the ground, thereby increasing the frictional resistance between the dynamic brake pads and the stationary brake pad to force deceleration; generating, by the permanent magnet generator, electricity, and providing a resistance opposite to a rotation direction of the follow-up reel in a process of releasing the fire-proofing and flame-retardant lifeline by the follow-up reel to reduce a descent speed; and detecting, by the intelligent detection and control device, a descent speed of the fire-proofing and flame-retardant lifeline from the beginning, initiating and intelligently controlling, by the intelligent detection and control device, the current of the active brake coil when the descent speed of the fire-proofing and flame-retardant lifeline exceeds a set value, and reducing the descent speed of the rescuee to the set value. Preferably, the intelligent detection and control device intelligently controls a landing speed of the rescuee to approach zero, so as to ensure safe landing of the rescuee without injury.

According to the intelligent life-saving system for a high-rise building of the present invention, a coverall with short-term (generally within 15 min) high temperature resistance and collision resistance is used to enable a rescuee to pass through a fire site with high temperature and dense smoke, and the coverall has an anti-collision function during jumping down for escape; a fire-proofing and flame-retardant lifeline is wound around a follow-up reel, and may have a length much longer than a rope that can be received in an escape backpack. In addition, the fire-proofing and flame-retardant lifeline keeps moving down when the rescuee is jumping down, rather than being roasted immovably, so that the chance of rope breakage is reduced. A lower end of the fire-proofing and flame-retardant lifting rope is quickly connected to and detached from the high-temperature resistant sling, so that the rescuee can leave the site quickly and safely, with less time in the fire site.

In addition to the objectives, features and advantages described above, the present invention has other objectives, features and advantages. The present invention will be further described in detail with reference to the drawings.

BRIEF DESCRIPTION OF THE DRAWINGS

The drawings are included to provide a further understanding of the present invention and are incorporated in and constitute a part of this application. The exemplary embodiments of the present invention and description thereof are intended to be illustrative, and are not to be construed as limiting the present invention. In the drawings.

DESCRIPTION OF REFERENCE NUMBER

1. suspension ring; 2. brake pad spindle; 3. frame;
4. stationary brake pad; 5. forced braking activation cable hole; 6. fixing forced braking activation clamp;
7. auxiliary brake pad spindle; 8. primary brake spring fixing frame; 9. primary brake springs;
10. dynamic brake pads; 11. auxiliary brake permanent magnet sleeve; 12. intelligent detection and control device;
13. follow-up reel; 14. auxiliary brake springs; 15. auxiliary brake multipolar permanent magnet ring;
16. active brake coil; 17. active brake soft magnetic sleeve; 18. dynamic brake pad positioning and pressing table;
19. soft and hard magnet sheaths; 20. permanent magnet generator coil; 21. device bearing;
22. multipolar permanent magnet of permanent magnet generator; 23. device spindle; 24. forced braking activation self-locking ring;
25. fire-proofing and flame-retardant lifeline; 26. forced braking activation cable; 27. high-temperature resistant elevator;
28. high-temperature resistant sling; 29. oxygen-supplying helmet; 30. coverall;
31. fire-proofing and flame-retardant cloth; 32. gel cold storage blocks of mosaic structure.

DETAILED DESCRIPTION OF THE PREFERRED EMBODIMENTS

It should be noted that the embodiments and features of the embodiments in this application may be combined with each other without conflict. The present invention will be described in detail with reference to the drawings and embodiments.

FIG. 1 to FIG. 9 show some embodiments according to the present invention.

The equipment used in the life-saving device is described below.

Figure 1:
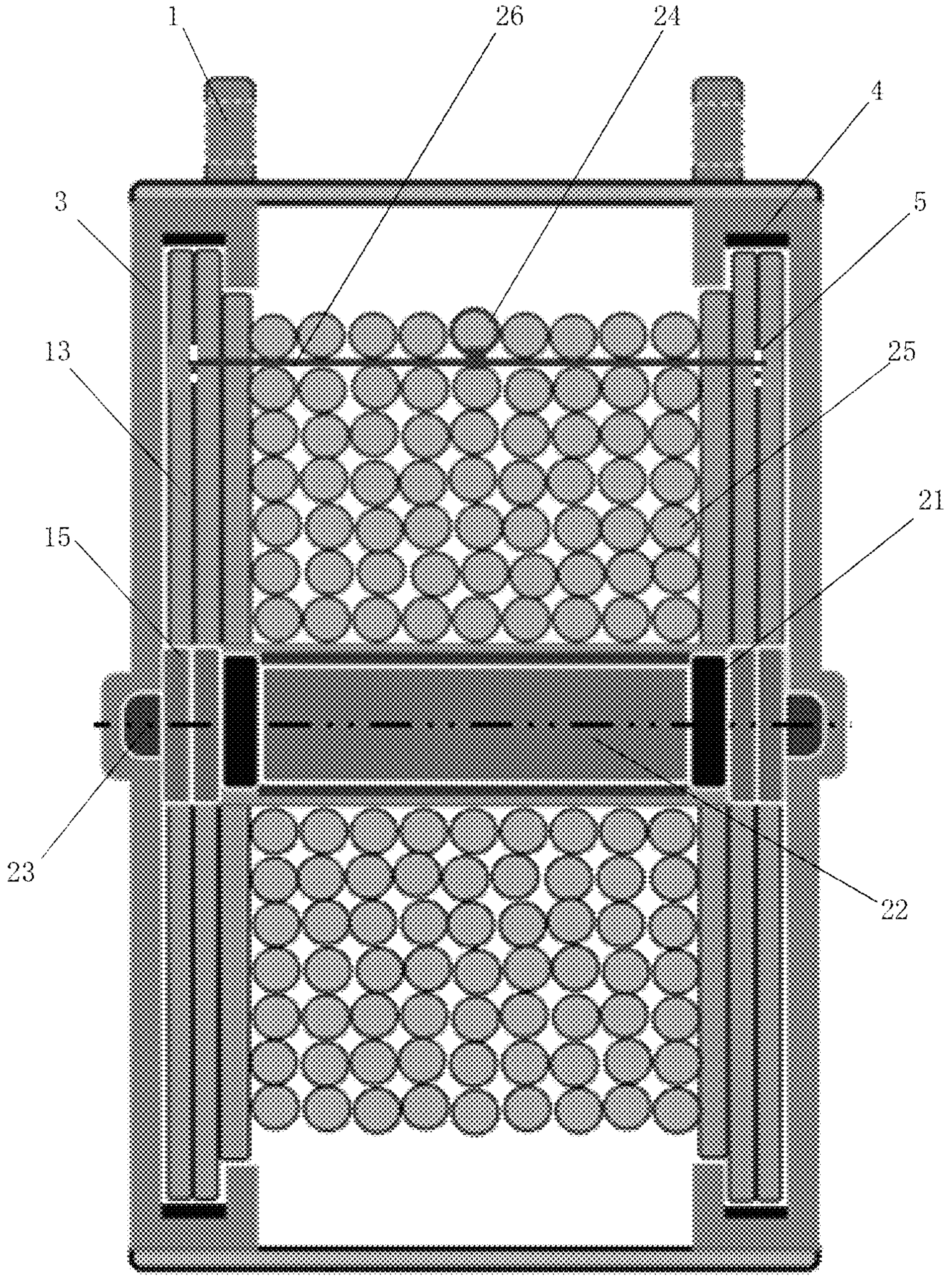
FIG. 1 is a schematic diagram of a structure of an electromechanical device for intelligent fast descent according to the present invention.

FIG. 1 is a schematic diagram of an internal structure of the life-saving device. As shown in FIG. 1, a suspension ring 1 and a stationary brake pad 4 are both fastened to a frame 3, and the frame 3 is integrated with two ends of a device spindle 23; an auxiliary brake multipolar permanent magnet ring 15, a multipolar permanent magnet 22 of a permanent magnet generator and an inner bearing ring of a device bearing 21 are fastened to the device spindle 23; a fire-proofing and flame-retardant lifeline 25 is evenly wound around a follow-up reel 13; a forced brake cable 26 and an outer bearing ring of the device bearing 21 are fastened to the follow-up reel 13; a buckle at one end of a forced braking activation self-locking ring 24 is fastened to the fire-proofing and flame-retardant lifeline 25, the other end of the forced braking activation self-locking ring 24 is fastened to the forced braking activation cable 26, and the forced braking activation cable 26 extends through cable holes 5 on both sides of the follow-up reel 13.

Figure 2:
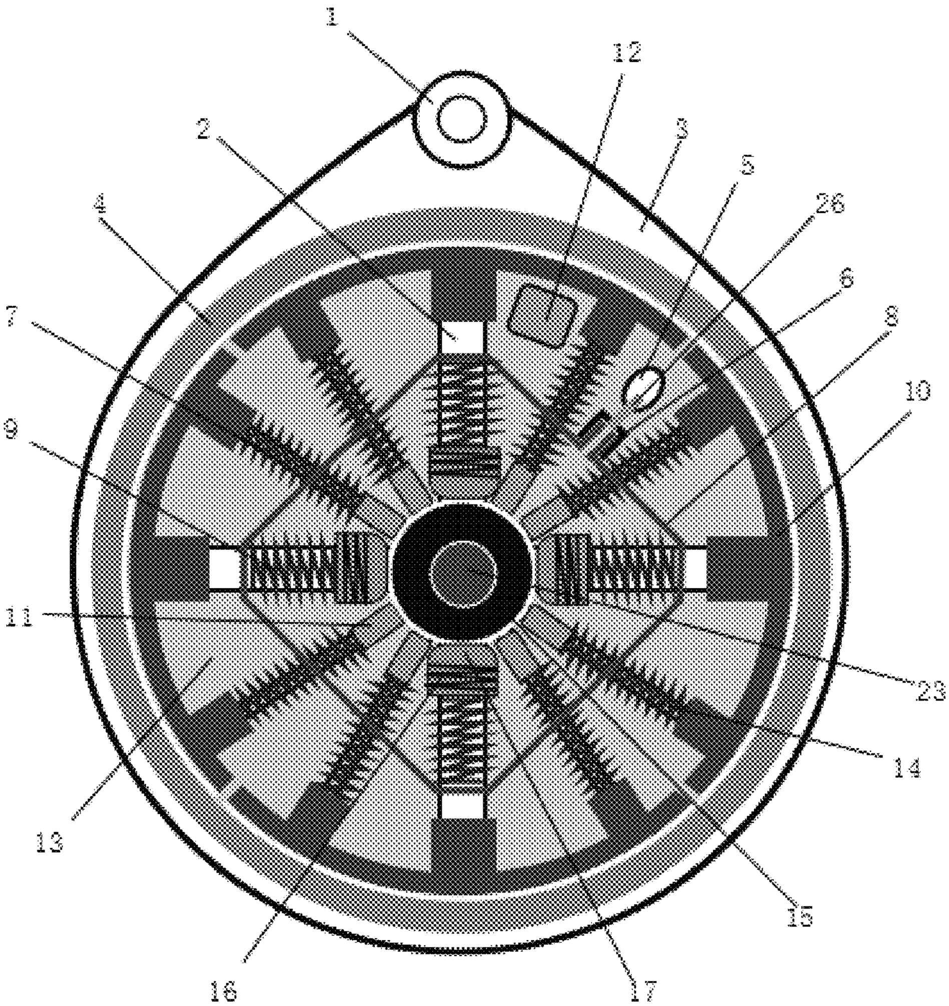
FIG. 2 shows a structure of brake mechanisms at both ends of a follow-up reel of the electromechanical device for intelligent fast descent according to the present invention.

FIG. 2 is a schematic diagram of an internal structure of an end at one side of the life-saving device. As shown in FIG. 2, the suspension ring 1, the frame 3 and the stationary brake pad 4 are fastened together with the two ends of the device spindle 23; a brake pad spindle 2 and an auxiliary brake pad spindle 7 are fastened to the follow-up reel 13; primary brake springs 9 and an active brake soft magnetic sleeve 17 are sleeved on the brake pad spindle 2, and an active brake coil 16 is sleeved on the active brake soft magnetic sleeve 17.

A primary brake spring fixing frame 8 compresses the primary brake springs 9 on the brake pad spindle 2 and clamps the primary brake spring fixing frame 8 with a fixing forced braking activation clamp 6; a cable hole 5 is formed on the follow-up reel 13, and the forced braking activation cable 26 is connected to the forced braking activation clamp 6 through the cable hole 5; auxiliary brake springs 14 and an auxiliary brake permanent magnet sleeve 11 are sleeved on the auxiliary brake pad spindle 7; dynamic brake pads 10 are positioned and limited on the brake pad spindle 2 and the auxiliary brake pad spindle 7 to allow radial movement; and the auxiliary brake multipolar permanent magnet ring 15 is fixedly connected to the device spindle 23.

Figure 3:
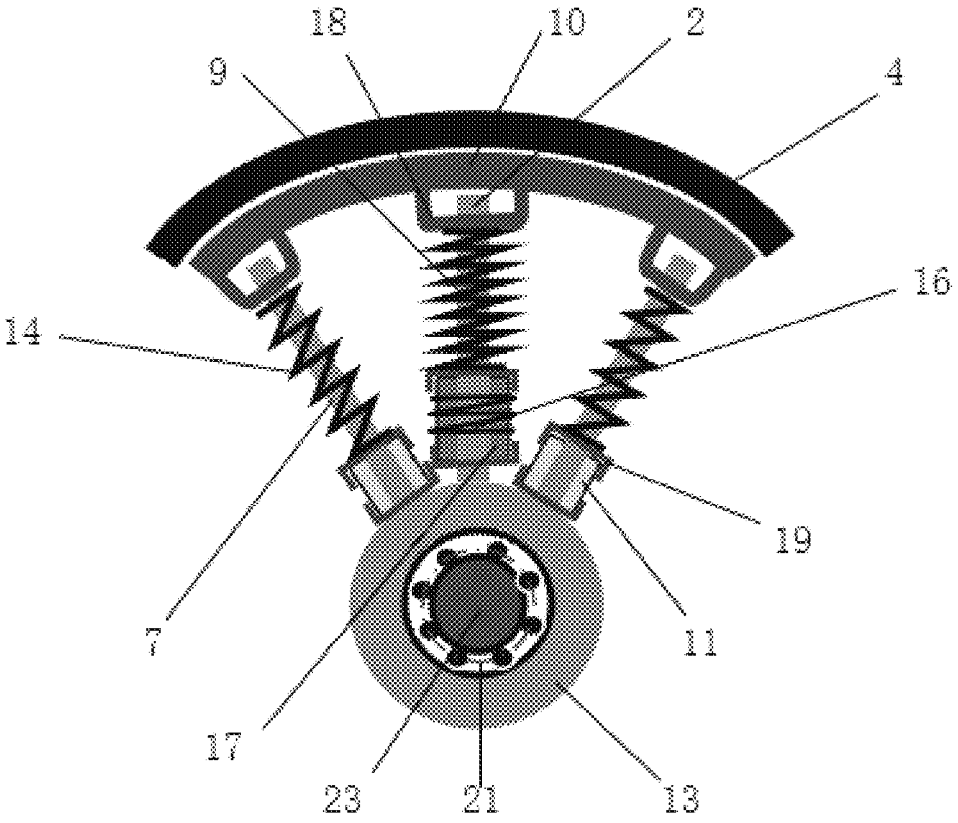
FIG. 3 illustrates the principle of a brake structure of brake mechanisms of the electromechanical device for intelligent fast descent according to the present invention.

As shown in FIG. 3, both ends of the auxiliary brake permanent magnet sleeve 11 and the active brake soft magnetic sleeve 17 are sleeved with soft and hard magnet sheaths 19, the auxiliary brake permanent magnet sleeve 11 is sleeved on the auxiliary brake pad spindle 7, the active brake soft magnetic sleeve 17 is sleeved on the brake pad spindle 2, the auxiliary brake springs 14 are sleeved on the auxiliary brake pad spindle 7, and the primary brake springs 9 are sleeved on the brake pad spindle 2; a dynamic brake pad positioning and pressing table 18 and dynamic brake pads 10 are integrally fixed, the follow-up reel 13 is fixedly sleeved on an outer ring of the device bearing 21, and an inner ring of the device bearing 21 is fixedly sleeved on the device spindle 23.

Figure 4:
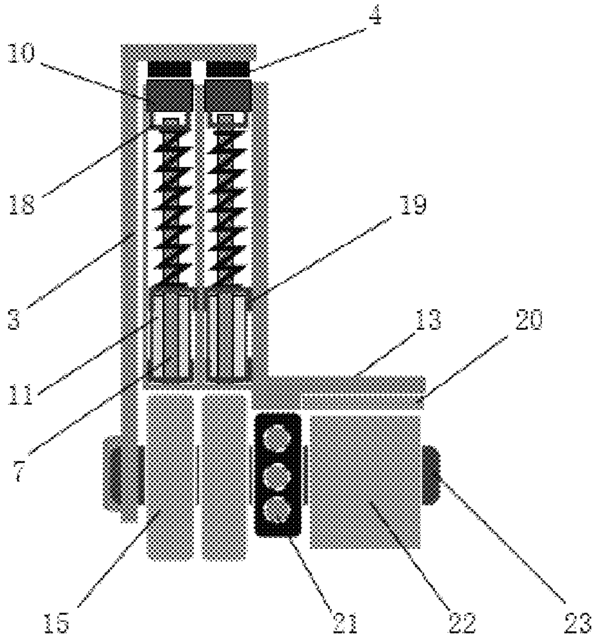
FIG. 4 shows a structure of auxiliary braking manipulation mechanisms of brake mechanisms of the electromechanical device for intelligent fast descent according to the present invention.

As shown in FIG. 4, the auxiliary brake multipolar permanent magnet ring 15, the device bearing 21 and the multipolar permanent magnet 22 of the permanent magnet generator are fixedly sleeved on the device spindle 23, the stationary brake pad 4 is fastened to the frame 3, and the frame 3 is fastened at an end position of the device spindle 23; the auxiliary brake pad spindle 7, the permanent magnet generator coil 20 and the outer ring of the device bearing 21 are fastened to the follow-up reel 13, the dynamic brake pads 10 and the dynamic brake pad positioning and pressing table 18 are integrally fixed, the auxiliary brake permanent magnet sleeve 11 is sleeved on the auxiliary brake pad spindle 7, and the soft and hard magnet sheaths 19 enclose the auxiliary brake permanent magnet sleeve 11 from both ends.

Figure 5:
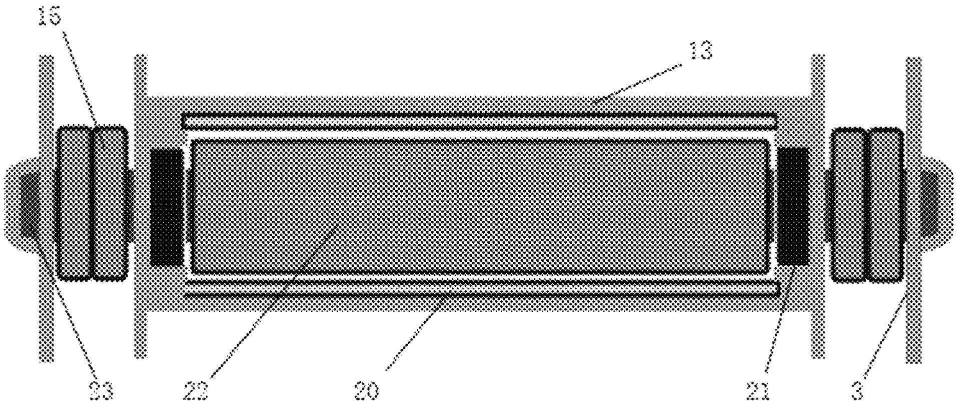
FIG. 5 shows an assembly structure of a main shaft of the electromechanical device for intelligent fast descent according to the present invention.

As shown in FIG. 5, the permanent magnet generator coil 20 and the outer bearing ring of the device bearing 21 are built in and fastened to the follow-up reel 13, the frame 3 is fastened at both ends of the device spindle 23, and the auxiliary brake multipolar permanent magnet ring 15, the multipolar permanent magnet 22 of the permanent magnet generator and the inner bearing ring of the device bearing 21 are fastened to the device spindle 23.

Figure 6:
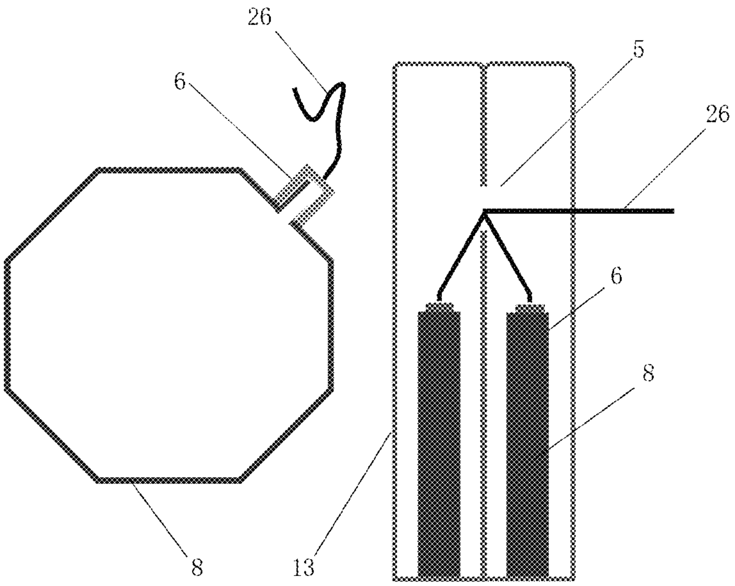
FIG. 6 shows a structure of a forced braking manipulation mechanism of the electromechanical device for intelligent fast descent according to the present invention.

As shown in FIG. 6, the forced braking activation cable 26 is connected to the fixing forced braking activation clamp 6, the fixing forced braking activation clamp 6 clamps a joint position of the primary brake spring fixing frame 8, and the primary brake spring fixing frame 8 is placed in 13; two ends of the forced braking activation cable 26 are respectively outspread into two ends, one outspread end is connected to a fixing forced braking activation clamp 6 inside the follow-up reel 13, and the other outspread end is connected to a fixing forced braking activation clamp 6 outside the follow-up reel 13 after passing through the cable hole 5.

Figure 7:
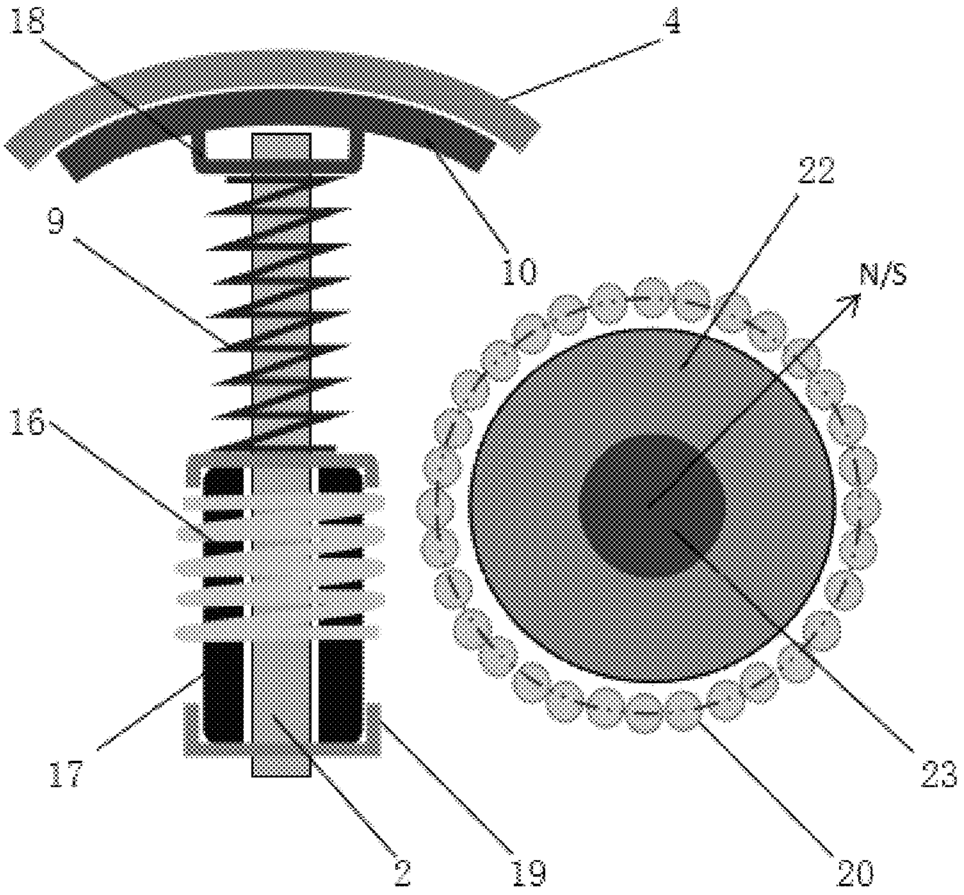
FIG. 7 shows a structure of an active braking manipulation mechanism of the electromechanical device for intelligent fast descent according to the present invention.

As shown in FIG. 7, the dynamic brake pad positioning and pressing table 18 is fastened to the dynamic brake pads 10, the soft and hard magnet sheaths 19 enclose the active brake soft magnetic sleeve 17 from both ends, and the active brake coil 16 is on a periphery of the active brake soft magnetic sleeve 17; the active brake soft magnetic sleeve 17 and the primary brake springs 9 are sleeved on the brake pad spindle 2; the dynamic brake pad positioning and pressing table 18 and the soft and hard magnet sheaths 19 limit the primary brake springs 9, the multipolar permanent magnet 22 of the permanent magnet generator is fixedly sleeved on the device spindle 23, and the permanent magnet generator coil 20 is evenly wound around the multipolar permanent magnet 22 of the permanent magnet generator in a non-contact manner.

Figure 8:
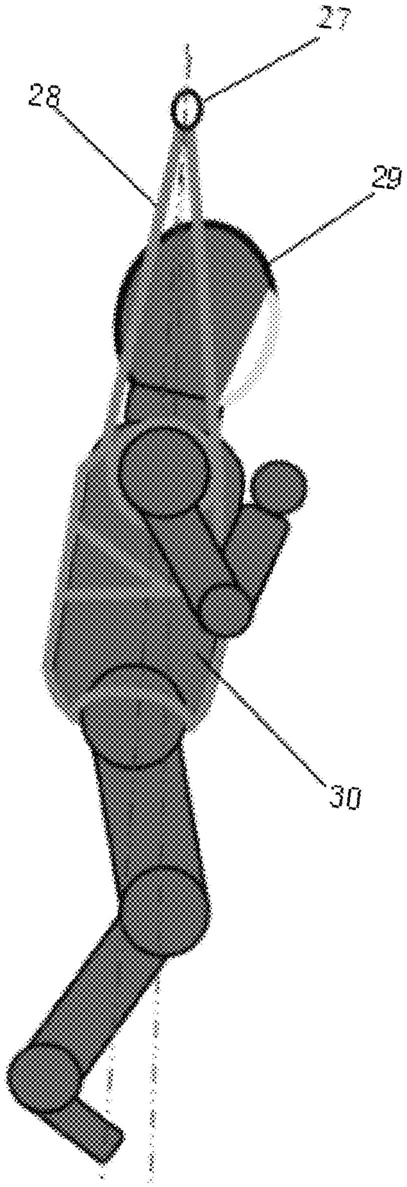
FIG. 8 shows a hanging posture of a rescuee during jumping down in an intelligent life-saving system for a high-rise building according to the present invention.

As shown in FIG. 8, a high-temperature resistant sling 28 is long in front and short in back to keep the center of gravity of a rescuee slightly forward (a landing posture of the rescuee from a height), a high-temperature resistant elevator 27 is fastened to the high-temperature resistant sling 28, and the high-temperature resistant sling 28 is fixedly connected to a coverall 30 through roots of two thighs, two shoulders, upper chest and upper back of the rescuee. The rescuee puts on an oxygen-supplying helmet 29, then puts on the coverall 30, pulls a zipper of the coverall 30 up from the lower abdomen to the neck, and tightens a self-locking cable at the neck of the coverall 30. The coverall 30 completely encloses and seals an outer edge of the rescuee including the oxygen-supplying helmet 29. The cable at the neck of the coverall 30 has a self-locking function to keep all parts of the body of the rescuee completely isolated from the outside without looseness. The coverall 30 is a coverall integrating a neck guard, gloves, shoes, clothes and trousers. The coverall 30 is capable of protecting a rescuee from collision and impact, and has soles with slip resistance, puncture prevention and cushioning for landing.

Figure 9:
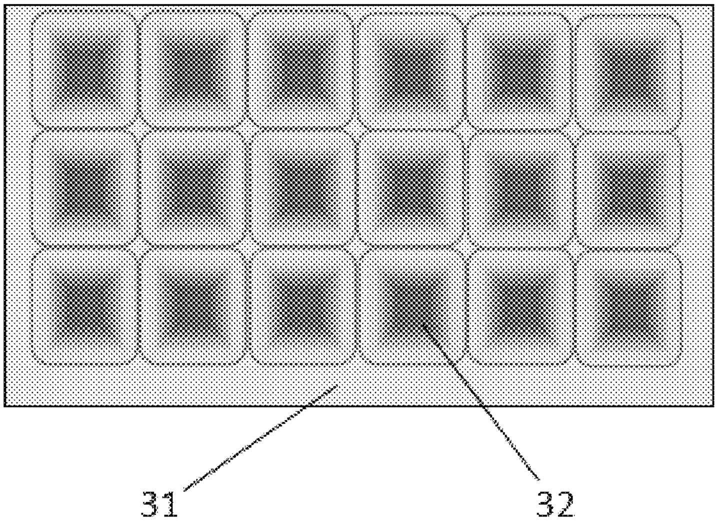
FIG. 9 shows a schematic diagram of a fire-proofing and flame-retardant cloth lined with gel cold storage blocks according to the present invention.

In FIG. 9, a fire-proofing and flame-retardant cloth 31 is a double-layer meta-aromatic polyamide cloth lined with gel cold storage blocks 32 of a mosaic structure, and a fire-proofing and flame-retardant layer is uniformly sprayed on a surface of an outer layer of the meta-aromatic polyamide cloth to form a soft fire-proofing and flame-retardant material with heat insulation, collision resistance, impact resistance and cushioning. The formed coverall 30 and the fire-proofing and flame-retardant cloth 31 are soft and convenient for activities of the rescuee.

The application method of the intelligent life-saving device for a high-rise building is described below.

When a fire detection and alarm system of each building detects a fire in the building, the fire detection system automatically repeats wireless broadcast on each floor immediately based on detected fire situation.

For the first time, an intelligent life-saving system for a high-rise building is placed in a house of a user who may need to be rescued, and after an intelligent detection and control device 12 is installed with a miniature energy storage power supply on the scene, the intelligent detection and control device 12 on an electromechanical device of intelligent fast descent is automatically networked with a fire detection and alarm system on the floor for mutual detection to confirm a unique identification code.

The energy storage power supply for the intelligent detection and control device 12 on the electromechanical device for intelligent fast descent is normally kept in a dormant state. Once the electromechanical device for intelligent fast descent is touched by a rescuee, the intelligent detection and control device on the electromechanical device is immediately awakened and automatically linked to receive real-time information on fire broadcast by the fire detection and alarm system on the floor.

Based on the real-time information on the fire broadcast by the fire detection and alarm system, the intelligent detection and control device 12 on the electromechanical device for intelligent fast descent intelligently reminds and informs the rescuee by voice of specific floor where the fire breaks out, detailed fire location, external fire situation, method for blocking spread of fire (for example, do not open the door) and escape route out of trouble.

Through the whole process of voice guidance, timely psychological counseling and use of complete life-saving devices to quickly leave the site of an accident, the chance for the rescuee surviving in good condition will be greatly improved.

In the event of a fire in the building, as long as a frame 3 is slightly moved (picked up), a mechanical normally open contact of the intelligent detection and control device 12 in the frame 3 is closed and automatically activated, and the intelligent detection and control device 12 is intelligently linked to a fire-fighting system of the building automatically, and provides voice information (reminder) regarding how to use the intelligent life-saving device for the high-rise building properly and continuous psychological comfort to the rescuee.

By informing (reminding) the rescuee by voice of reaching within 2 m near a suspension ring buckle on a wall for fixedly suspending the electromechanical device for escape, the intelligent detection and control device on the electromechanical device automatically detects and identifies passive RF cards within 2 m near the suspension ring buckle on the wall by radio frequency technology, automatically re-identifies and determines an exact distance from a location where the rescuee is located to the ground, and intelligently calculates a speed control scheme for safe landing of the rescuee from such a height.

Fire locations are variable, an escape location indicated by voice from the intelligent detection and control device 12 is specifically determined based on actual fire situation at the site. The height from the same floor to the ground floor may be inconsistent, and the location can be automatically identified and determined by radio frequency technology at the site.

When the weight of the rescuee varies, the intelligent detection and control device 12 intelligently controls a speed and an acceleration of the intelligent life-saving device for the high-rise building at each height position, and the minimum speed at a landing position until the rescuee lands safely.

The frame 3 is completely enclosed by a fire-proofing and flame-retardant bag, one end of a high strength fire-proofing and flame-retardant lifting rope for suspending the frame 3 extends into the fire-proofing and flame-retardant bag to be firmly locked with a suspension ring 1 on the frame 3, and bound by the fire-proofing and flame-retardant bag; and the other end of the high strength fire-proofing and flame-retardant lifting rope is equipped with a self-locking hook to make sure that the hook does not come off itself.

During normal storage, an end of a lifeline on the frame 3 is detached from the high-temperature resistant elevator 27 on the high-temperature resistant sling 28. After a rescuee wears the oxygen-supplying helmet 29 and the coverall 30 made of the fire-proofing and flame-retardant cloth 31, the coverall is bucked to the end of the lifeline through the high-temperature resistant elevator 27 on the high-temperature resistant sling 28 (after leaving dangerous areas, the rescuee presses a release pin on the buckle with two fingers when the fire-proofing and flame-retardant lifeline 25 is loose, then the end of the lifeline on the frame 3 is separated from the high-temperature resistant elevator 27.

After leaving a dangerous area, the rescuee manually loosens the self-locking cable at an upper end of the neck guard to restore natural breathing, and he can wear the oxygen-supplying helmet 29 and the coverall 30 made of the fire-proofing and flame-retardant cloth 31, or take off the oxygen-supplying helmet 29 and the coverall 30 made of the fire-proofing and flame-retardant cloth 31 on the spot (after landing, the oxygen-supplying helmet 29 and the coverall 30 made of the fire-proofing and flame-retardant cloth 31 still have some self-rescue functions of fire prevention, wind prevention, rain and snow prevention, heat insulation, floating on water and impact resistance). The oxygen-supplying helmet 29 is a heat-insulated, fire-proofing and flame-retardant oxygen-supplying helmet with a rigid mask; and the coverall 30 is a fire-proofing and flame-retardant coverall integrated with a neck guard, gloves, shoes, clothes and trousers, and is made of meta-aromatic polyamide lined with gel for cold storage and heat insulation.

The coverall 30 has functions of fire prevention, flame retardance, heat insulation and cushioning of body collision and resistance to external damage within 15 min. The oxygen-supplying helmet 29 and the coverall 30 prevent the rescuee from colliding with a balcony or another structure protruding from the building during descent to hurt the rescuee. The coverall 30 has a function of cushioning for landing.

An inner side of the oxygen-supplying helmet 29 is provided with a miniature oxygen bag or a sodium peroxide oxygen generating bag, the rescuee directly bites open an oxygen outlet tube with a function of slowly releasing oxygen from the miniature oxygen bag for breathing or bites open a cover of an oxygen generator ($2Na_2O_2+2CO_2=2Na_2CO_3+O_2$) for reacting with carbon dioxide exhaled by the rescuee, so that the rescuee is naturally in a state of large breathing capacity during emergency evacuation, thereby ensuring that an air pressure inside the oxygen-supplying helmet 29 is slightly higher than an external pressure, completely preventing external high temperature, dense smoke and other heavily polluted air from intruding into the oxygen-supplying helmet 29 to harm the rescuee, and meeting the needs of the rescuee for breathing oxygen in a short time and passing through places filled with high temperature and toxic dense smoke.

The frame 3 is fixed upstairs. After a rescuee wrapped in the oxygen-supplying helmet 29 and the coverall 30 jumps out, only the fire-proofing and flame-retardant lifeline 25 in the frame 3 begins to extend with a rush-down force and body gravity of the rescuee for preventing the occurrence of a rescuer being suspended in the air without landing due to light weight of the rescuee and insufficient initial rush-down speed. Meanwhile, the primary brake springs 9 are locked by the primary brake spring fixing frame 8 to ensure that a pressure of the auxiliary brake pad spindle 7 on the dynamic brake pads 10 forms a frictional resistance between the dynamic brake pads 10 and the stationary brake pad 4.

Under the force of the auxiliary brake pad spindle 7 and the permanent magnet generator coil 20, a descent acceleration of the intelligent life-saving device for the high-rise building is less than an acceleration of a free fall. Due to a limited starting speed of the follow-up reel 13, electric energy generated by the permanent magnet generator coil 20 always meets energy supply for normal operation of the intelligent detection and control device 12, and electric energy generated by the permanent magnet generator coil 20 is reserved to meet demands of the active brake coil 16.

The fire-proofing and flame-retardant lifeline 25 is connected to the forced braking activation self-locking ring 24, the forced braking activation self-locking ring 24 is connected to the forced braking activation cable 26, the forced braking activation cable 26 is connected to the fixing forced braking activation clamp 6, the fixing forced braking activation clamp 6 clamps the primary brake spring fixing frame 8, and the forced braking activation self-locking ring 24 is forcibly pulled open and interlocked by the fire-proofing and flame-retardant lifeline 25, so that the fixing forced braking activation clamp 6 is separated from the primary brake spring fixing frame 8. After the primary brake spring fixing frame 8 gets loose, the intelligent life-saving device for the high-rise building enters an intelligent control state.

To ensure that the device works as reliably as possible, the descent acceleration is limited for the following purposes:

1) preventing a rescuee from physical discomfort due to large changes in acceleration and deceleration;
2) preventing the fire-proofing and flame-retardant lifeline 25 from breaking under a stress beyond the maximum stress in a deceleration process after the rescuee descends too fast;
3) preventing the rescuee from colliding with a balcony or another structure protruding from the building during descent to decelerate, while a rotating wheel still rotates at an inertial high speed, so that the fire-proofing and flame-retardant lifeline 25 is prematurely loosened and wound;
4) preventing irreversible situations resulting from failure of a brake apparatus due to high temperature from friction of brake pads after descent too fast; and
5) during descent of the rescuee, the fire-proofing and flame-retardant lifeline 25 dynamically extends and descends constantly, so that a situation in which the fire-proofing and flame-retardant lifeline 25 breaks due to continuous roasting by fire at a position on the floor will not occur. If the frame 3 is attached to the body of the rescuee, a position for extending the lifeline will always remain in place during descent, and thus a situation of continuous roasting by fire at high temperature occurs.

The fire-proofing and flame-retardant lifeline 25 is evenly distributed in a frame of the follow-up reel 13, and the follow-up reel 13 rotates after the fire-proofing and flame-retardant lifeline 25 is pulled. A pressure of a plurality of, for example, 32 auxiliary brake springs 14 on the follow-up reel 13 forces the dynamic brake pads 10 to generate a frictional resistance when rotating relative to the stationary brake pad 4. Meanwhile, the auxiliary brake multipolar permanent magnet ring 15 with external and internal radiation has the same polarity as the auxiliary brake permanent magnet sleeve 11 at a corresponding position. When the follow-up reel 13 rotates, a pulsating thrust on the auxiliary brake permanent magnet sleeve 11 allows the auxiliary brake springs 14 to be compressed, further increasing the friction between the dynamic brake pads 10 and the stationary brake pad 4, thereby limiting the descent acceleration of the rescuee.

After the rescuee descends to a set height above the ground, the fire-proofing and flame-retardant lifeline 25 on the follow-up reel 13 pulls the forced braking activation cable 26 through the forced braking activation self-locking ring 24, and the forced braking activation cable 26 pulls open the fixing forced braking activation clamp 6, so that the primary brake spring fixing frame 8 loses restraint, and a plurality of, for example, 16 primary brake springs 9 pop open, increasing the frictional resistance between the dynamic brake pads 10 and the stationary brake pad 4, and further forcing the follow-up reel 13 to decelerate rapidly.

The multipolar permanent magnet 22 of the permanent magnet generator of the intelligent life-saving device for the high-rise building is a multipolar permanent magnet with external and internal radiation. When the rescuee descends and pulls the fire-proofing and flame-retardant lifeline 25, the follow-up reel 13 rotates, and the permanent magnet generator coil 20 on the follow-up reel 13 rotates around the multipolar permanent magnet 22 of the permanent magnet generator to cut magnetic lines of force, thereby generating an induced electromotive force and an induced current without commutation.

The permanent magnet generator coil 20 and the multipolar permanent magnet 22 of the permanent magnet generator on the intelligent life-saving device for the high-rise building rotate relative to each other, that is, an induced electromotive force is generated on the permanent magnet generator coil 20, and generated electric energy charges an energy storage capacitor of an electromagnetic reduction gear, and maintains normal power for the intelligent detection and control device 12. Meanwhile, due to current passing through the permanent magnet generator coil 20, a force opposite to a rotation direction of the follow-up reel 13 will be generated on the follow-up reel 13 to prevent the rescuee from descent quickly.

The intelligent detection and control device 12 on the intelligent life-saving device for the high-rise building detects a descent speed of the fire-proofing and flame-retardant lifeline 25 from the beginning. When the descent speed of the fire-proofing and flame-retardant lifeline 25 is detected to exceed a set speed, such as 2 m/s, the intelligent detection and control device 12 starts and intelligently controls the active brake coil 16. The active brake coil 16 is sleeved on the active brake soft magnetic sleeve 17, and an electromagnetic field with the same polarity as a relative position of the auxiliary brake multipolar permanent magnet 15 is generated on the active brake soft magnetic sleeve 17, thereby generating a pressure on a plurality of (16) primary brake springs 9 to compress the primary brake springs 9 and further increase the frictional resistance between the dynamic brake pads 10 and the stationary brake pad 4. A repulsive force generated by the active brake coil 16 rotating along with the follow-up reel 13 will press the dynamic brake pads 10 through the primary brake springs 9 in an impulsive manner, so as to ensure that the descent speed of the rescuee is reduced to the set speed.

The rescuee descends and pulls the fire-proofing and flame-retardant lifeline 25. The intelligent detection and control device 12 of the intelligent life-saving device for the high-rise building detects a rotation angle of a turntable and a position of the fire-proofing and flame-retardant lifeline 25 on the follow-up reel 13, and calculates an instantaneous descent speed, an instantaneous descent acceleration and a distance from a landing point of the fire-proofing and flame-retardant lifeline 25 in real time. The intelligent detection and control device 12 controls current of the active brake coil 16, power-on time and quantity of used active brake coil in real time to adjust the descent speed and acceleration, so as to achieve the purpose of fast and safe landing.

The intelligent detection and control device 12 detects a real-time release length and speed of the fire-proofing and flame-retardant lifeline 25 on line, controls the fire-proofing and flame-retardant lifeline 25 to keep a "soft connection" with the rescuee, strictly controls a landing speed to prevent the rescuee from landing on the head, and maintains a quick cushioning posture of leaning forward and kneeling down after landing of the rescuee as much as possible. The high-temperature resistant sling 28 ensures that impact kinetic energy from landing of the rescuee is eliminated before the body of the rescuee touches the ground.

The coverall 30 can be made into a baby coverall or a baby & mother coverall, which is convenient for children who lack self-protection ability to get rescue.

The foregoing descriptions are merely preferred embodiments of the present invention and are not intended to limit the present invention. For a person skilled in the art, the present invention may have various changes and variations. Any modification, equivalent replacement, and improvement made within the spirit and principle of the present application shall be included in the protection scope of present application.

The invention claimed is:

1. An electromechanical device for intelligent fast descent, comprising a frame, a follow-up reel, a main shaft, and a fire-proofing and flame-retardant lifeline wound around the follow-up reel, and further comprising:

a permanent magnet generator, comprising a multipolar permanent magnet rotating synchronously with the main shaft, and a coil rotating synchronously with the follow-up reel, configured to generate electricity and form a rotational resistance when the coil rotates with the follow-up reel;

brake mechanisms, arranged symmetrically on both sides of the follow-up reel, comprising a stationary brake ring arranged on the frame and a plurality of arc-shaped dynamic brake pads rotating synchronously with the follow-up reel, wherein the plurality of arc-shaped dynamic brake pads are annularly arranged along an inner annular wall of the dynamic brake pads;

a plurality of active braking manipulation mechanisms, arranged at an inner side of the dynamic brake pads and pressed against the dynamic brake pads radially outwards, comprising a brake pad spindle, primary brake springs and an active brake soft magnetic sleeve that are arranged radially along the follow-up reel, an active brake coil wound around the active brake soft magnetic sleeve, and a multipolar permanent magnet ring arranged on the main shaft, wherein the active brake coil and the active brake soft magnetic sleeve form an electromagnet;

an intelligent detection and control device, configured to control current of the active brake coil in real time based on a descent speed of the fire-proofing and flame-retardant lifeline to adjust a frictional resistance between the dynamic brake pads and a stationary brake pad;

a plurality of auxiliary braking manipulation mechanisms, arranged at the inner side of the dynamic brake pads and pressed against the dynamic brake pads radially outwards, comprising an auxiliary brake pad spindle, auxiliary brake springs and an auxiliary brake sleeve; and a forced braking manipulation mechanism, comprising a primary brake spring fixing frame, a fixing forced braking activation clamp, a forced braking activation cable and a forced braking activation self-locking ring;

wherein the primary brake spring fixing frame is configured to restrain each primary brake spring, and the forced braking activation self-locking ring is secured at a predetermined length of the fire-proofing and flame-retardant lifeline to pull the forced braking activation cable when the fire-proofing and flame-retardant lifeline is released to the predetermined length, so as to force the fixing forced braking activation clamp to detach from the primary brake spring fixing frame, so that the primary brake springs are in a released state.

2. The electromechanical device for intelligent fast descent according to claim 1, wherein an active braking manipulation mechanism is centered on the inner side of the dynamic brake pads, and a pair of auxiliary braking manipulation mechanisms are arranged on both sides of the active braking manipulation mechanism, wherein a brake pad spindle of the active braking manipulation mechanism and an auxiliary brake pad spindle of the pair of auxiliary braking manipulation mechanisms are arranged in a strip shape.

3. The electromechanical device for intelligent fast descent according to claim 1, wherein two sets of brake mechanisms are axially arranged in parallel on both sides of the follow-up reel.

4. The electromechanical device for intelligent fast descent according to claim 1, wherein the auxiliary brake sleeve is an auxiliary brake permanent magnet sleeve for compressing the auxiliary brake springs in an impulsive manner when the follow-up reel rotates.

5. The electromechanical device for intelligent fast descent according to claim 1, wherein a fast descent control method therefor is as follows:

extending the fire-proofing and flame-retardant lifeline with a rush-down force and body gravity of a rescuee after the rescuee wrapped in an oxygen-supplying helmet and a coverall jumps down, when the auxiliary brake springs work and the primary brake springs are locked by the primary brake spring fixing frame;

pulling, by the fire-proofing and flame-retardant lifeline on the follow-up reel, the forced braking activation cable through the forced braking activation self-locking ring to force the primary brake spring fixing frame to lose restraint, and the primary brake springs to pop open after the rescue descends to a set height above the ground, thereby increasing the frictional resistance between the dynamic brake pads and the stationary brake pad to force deceleration;

generating, by the permanent magnet generator, electricity, and providing a resistance opposite to a rotation direction of the follow-up reel in a process of releasing the fire-proofing and flame-retardant lifeline by the follow-up reel to reduce a descent speed; and detecting, by the intelligent detection and control device, a descent speed of the fire-proofing and flame-retardant lifeline from the beginning, initiating and intelligently controlling the current of the active brake coil when the descent speed of the fire-proofing and flame-retardant lifeline exceeds a set value, and reducing the descent speed of the rescuee to the set value.

* * * * *